UNITED STATES PATENT OFFICE.

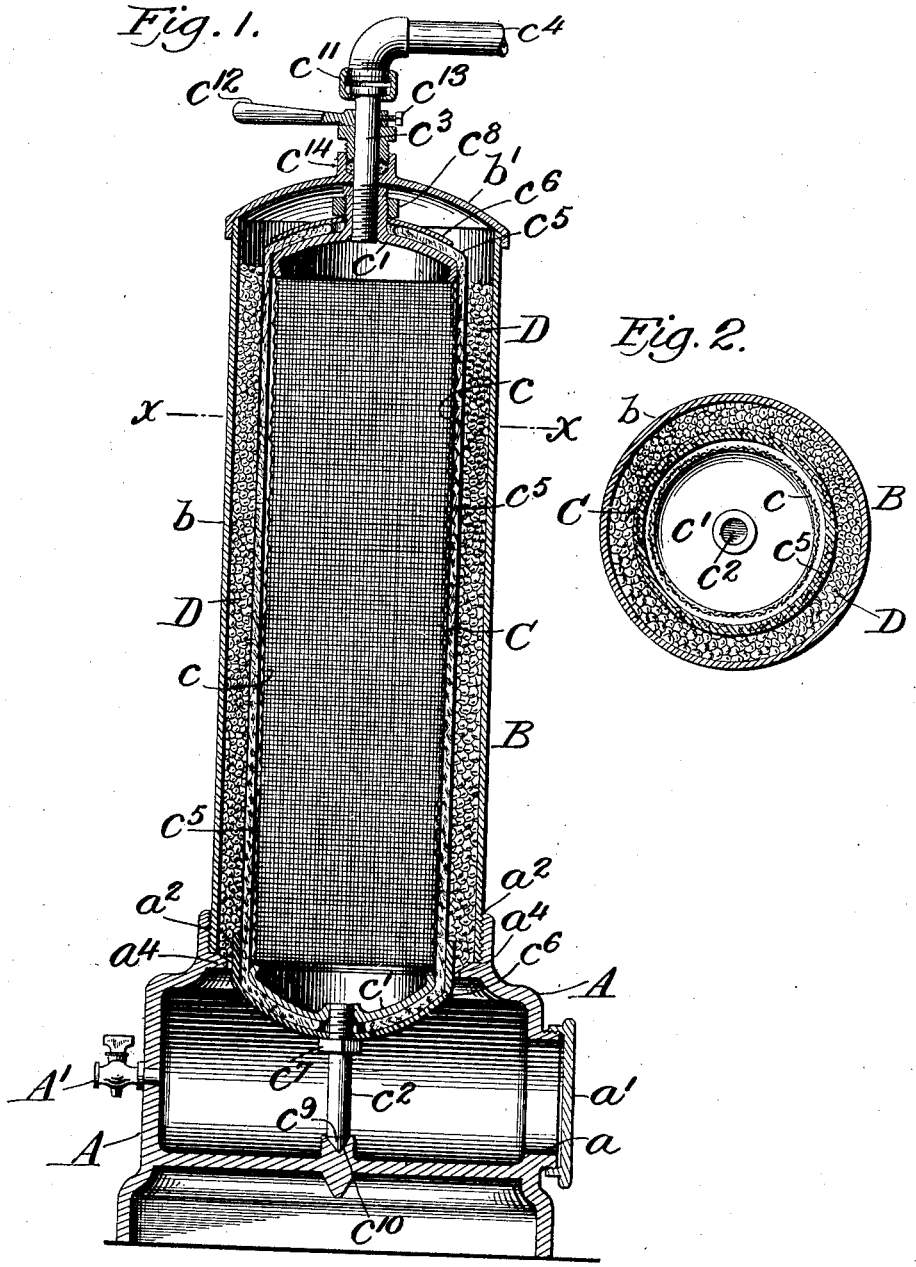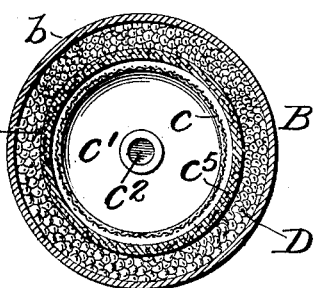

LÉON DION, OF WILKES-BARRE, PENNSYLVANIA, ASSIGNOR TO THE AMERICUS ELECTRO-HERMETIC COMPANY, OF NEW YORK, N. Y., A CORPORATION OF ARIZONA TERRITORY.

FILTER AND CLEANER THEREFOR.

No. 829,576. Specification of Letters Patent. Patented Aug. 28, 1906.

Application filed March 25, 1905. Serial No. 252,071.

*To all whom it may concern:*

Be it known that I, LÉON DION, a citizen of the United States, and a resident of Wilkes-Barre, in the county of Luzerne and State of Pennsylvania, have invented certain new and useful Improvements in Filters and in Cleaners Therefor, of which the following is a specification.

My invention while relating to filters that are employed in the purification of various substances is especially applicable to filters that are employed to remove mechanical impurities from water during the process of its purification; and it has for its objects not only the simplification of the filter and the mounting of the same whereby a relative movement between its outer surface and the surface of a cleaning medium may be effected, but also the provision of a cheap and efficient cleaning means whereby any impurities that may be deposited upon the outer surface of the filter during the filtering operation may be removed.

To these ends the invention consists in the peculiar construction and combination of parts, all as will hereinafter more fully appear.

Referring to the accompanying drawings, which form a part of this specification, Figure 1 is a vertical axial section of a filter and cleaner constructed in accordance with my invention; and Fig. 2, a transverse section thereof, taken in the plane $x\,x$ of Fig. 1.

In the drawings, A indicates the tank or reservoir which receives the water or other material to be filtered and which is delivered thereto from the source of supply (not shown) through a suitable pipe or main A'. This tank or reservoir may be constructed in various forms. In the embodiment of the invention which I have selected for the purposes of illustration, however, it is constructed of rectangular form, with an opening $a$ in one of its sides, through which access may be had to its interior to remove the contents thereof or otherwise and which said opening is or may be closed when desired by a cap or cover $a'$, detachably secured thereover by screw-threads or by other equivalent means, as may be preferred. As thus constructed this tank or reservoir A receives and supports a chamber B, which is mounted thereon and which is preferably constructed with its side walls in the form of an annular shell or casing $b$, with its lower end threaded or otherwise secured in a suitable orifice $a^2$, formed in the top of the tank or reservoir A, and its upper end provided with an inverted-cup-shaped cover or cap $b'$, threaded or otherwise secured thereon. Within the chamber B as thus constructed is the filter C, by means of which the filtration of the water or other material is effected. This filter may be of any ordinary or preferred construction. As here shown, however, it is composed of a cylindrical body $c$, which is somewhat less in diameter than the interior of the chamber B and is formed from any suitable foraminated or reticulated material, with convex ends $c'$, applied thereto, and which are or may be struck up or otherwise formed from imperforate material, if so desired. As thus constructed this body $c$, with its ends $c'$, is supported upon a vertical axis within the chamber B by a short shaft or stud $c^2$, which is or may be threaded at its upper end in the bottom end $c'$ of the body $c$ and is supported at its lower end from the bottom of the tank or reservoir A, while from the top end $c'$ of the body extends an outlet-pipe $c^3$, which is or may be threaded at its lower end therein and is connected at its own upper end with a similar pipe $c^4$, which leads to the place of discharge. The body $c$, with its ends $c'$, being thus supported within the chamber B has applied to its exterior a layer of filtering material $c^5$, through which the water or liquid is passed and the separation of all particles of metal or other foreign substances therefrom effected. In the selection of this filtering material any appropriate substance that is adapted for the purpose may be adopted. I prefer, however, to employ felt as the filtering medium and to apply it over both the foraminated or reticulated cylindrical portion $c$ of the filter-body and over the imperforate ends $c'$ thereof and to hold it firmly in that relationship by concave clamping members $c^6$, which are held firmly clamped against the respective top and bottom ends $c'$ by nuts $c^7$ and $c^8$, of which the butts $c^7$ engage with the threaded portions of the short shaft or stud $c^2$ and coöperates with the lower clamping member, while the nut $c^8$ similarly engages with the threaded portion of the outlet-pipe $c^3$ and coöperates with the upper clamping member, as shown.

With the filter constructed and arranged as above explained the water or other material rising in the chamber B will pass through the filter and thence flow upward through the outlet-pipe $c^3$ and $c^4$ to the place of discharge. In thus passing through the filter any particles or foreign substance contained in the water or other material and held in suspension therein will be arrested by the filter-covering $c^5$ as such water or other liquid passes therethrough, and such covering in time becomes more or less clogged or contaminated by them in consequence thereof unless provisions are made for their removal. In order, therefore, to obviate this clogging or contamination, I employ means whereby the particles or other substances that accumulate thereon may be removed and the covering thereby renovated from time to time. These means in my preferred form of construction consists of loose masses of small broken stone or pebbles. I prefer, however, to employ small pebbles for the purpose; but whatever its nature the separate constituents are preferably of a size sufficiently large to be incapable of passing downwardly through the space between the filter and the inner edge of the inwardly-projecting flange $a^4$. The cleaning material being thus arranged and being in contact with the exterior of the covering $a^5$ of the filter, the cleaning of this covering may be effected by a relative movement between its outer surface and the interior coöperating surface of the mass of the cleaning material. To permit of this relative movement being accomplished when it is desired to effect it through the filter, the lower end of the short shaft or stud $c^2$ is formed as a step $c^9$, which rests in an appropriate step-bearing $c^{10}$, supported upon the bottom of the tank or reservoir A, while the outlet-pipe $c^3$, instead of extending to the place of discharge, is so united at its upper end with a similar pipe $c^4$, leading to that destination, by a coupling $c^{11}$ as to be capable of rotation thereon. As thus arranged the rotation of the filter in the cleaning material when desired may be effected by any convenient means. In the form of the invention shown in the drawings, however, it is effected by a handle $c^{12}$, which is fixedly secured to the outlet-pipe $c^3$ by a set-screw $c^{13}$, and in order to prevent the escape of the water or other material being filtered around this pipe, while yet allowing of the rotation of the pipe within the cap or cover $b'$, this cap or cover, instead of having the pipe fixedly secured therein, is provided with a stuffing-box $c^{14}$, through which the pipe passes and in which it may be rotated as required.

With the parts constructed as above described when water or other material is admitted under pressure to the tank or reservoir A it will rise through the passage-way between the inner edge of the flange $a^4$ in the orifice $a^2$ and the exterior surface of the filter and pass through the filter-covering into the filter, from which it will pass upward and outward through the discharge-pipes $c^3$ and $c^4$ to the point of discharge. In thus passing through the covering of the filter any particles or other foreign substances held in suspension in the water or other material will be arrested and only the purified water or other material allowed to enter the filter and thence pass to the place of discharge. The particles or other foreign substances thus arrested by the covering of the filter will after a more or less protracted use of the filter serve to clog or arrest the passage of the water or other material therethrough, and their removal therefrom will from time to time be necessary. In order, therefore, to effect this removal, a continuous or a back-and-forth rotation will be imparted to the filter through the handle $c^{12}$ or otherwise for a short time, when the action of the cleaning material D upon the exterior surface of the filter will scrape or remove such particles or other impurities adhering thereto and leave the filter free for its further operation.

From the foregoing, therefore, it will thus be seen that I produce a filter and a cleaner therefor which are at once not only simple and comparatively inexpensive in construction and convenient and efficient in operation, but which are extremely compact and admirably suited to the purposes for which they are intended.

Although in the drawings I have shown and in the above described the best means contemplated by me for carrying my invention into practice, I do not limit myself strictly thereto, as it is also obvious that various of the details of construction may be varied in different ways without departing from the spirit of the invention.

Having now described my invention and specified certain of the ways in which it is or may be carried into effect, I claim and desire to secure by Letters Patent of the United States—

The combination, with a perforated cylindrical body provided with convex ends and a covering of appropriate filtering material, a chamber in which it is arranged, and means by which the material to be filtered may be supplied to the exterior of the filter, of a step and bearing upon which the filter is supported, concave clamping members for clamping the covering of the filtering material to the convex ends of the cylindrical body, means for forcing the concave clamping members against such convex ends, a loose mass of broken stone or pebbles interposed between the exterior of the filter-covering and the interior of the chamber in which the filter is arranged, means by which a movement around its axis may be imparted to the filter, and a discharge-pipe leading from the interior of said filter and provided with a coupling which allows of the movement of one member with respect to the other, substantially as described.

In witness whereof I have hereunto set my hand this 18th day of March, 1905.

LÉON DION.

Witnesses:
Wm. H. Appleton,
R. F. Sweeny.